(12) United States Patent
Schaefer

(10) Patent No.: US 6,204,499 B1
(45) Date of Patent: Mar. 20, 2001

(54) METHOD AND APPARATUS FOR A ROTATION ANGLE SENSOR

(75) Inventor: Philip Schaefer, Sedona, AZ (US)

(73) Assignee: Simula, Inc., Phoenix, AR (US)

( * ) Notice: Subject to any disclaimer, the term of this patent is extended or adjusted under 35 U.S.C. 154(b) by 0 days.

(21) Appl. No.: 09/092,553

(22) Filed: Jun. 5, 1998

Related U.S. Application Data

(60) Provisional application No. 60/048,738, filed on Jun. 5, 1997, and provisional application No. 60/062,336, filed on Oct. 15, 1997.

(51) Int. Cl.$^7$ ............................... G01P 5/06; G01P 15/03
(52) U.S. Cl. ..................... 250/231.1; 250/227.14
(58) Field of Search .......................... 250/216, 227.11, 250/227.14, 231.1, 231.13, 237 R, 237 G; 341/14; 73/862.23, 862.26

(56) References Cited

U.S. PATENT DOCUMENTS

| | | |
|---|---|---|
| 3,680,378 | 8/1972 | Aurilio et al. . |
| 3,940,983 | 3/1976 | Greene . |
| 4,002,077 | 1/1977 | Taplin . |
| 4,056,722 * | 11/1977 | Ray .................................. 250/231.13 |
| 4,163,325 | 8/1979 | Hughes . |
| 4,232,553 | 11/1980 | Benedetto et al. . |
| 4,361,040 | 11/1982 | Taplin et al. . |
| 4,679,029 * | 7/1987 | Krohn et al. ........................... 341/14 |
| 4,779,353 | 10/1988 | Lopes et al. . |
| 4,825,708 | 5/1989 | Sevick . |
| 4,903,531 | 2/1990 | LeBlond et al. . |
| 4,976,157 | 12/1990 | Berthold et al. . |
| 5,120,951 | 6/1992 | Small . |
| 5,416,977 | 5/1995 | Striffler et al. . |

* cited by examiner

*Primary Examiner*—John R. Lee
(74) *Attorney, Agent, or Firm*—Shaw Pittman

(57) ABSTRACT

A rotation angle sensor has a fluid-filled container which houses a vane immersed in the fluid. The vane which rotates freely with respect to the container. The container is fixedly attached to a body for which rotation angle measurement is desired. When the body, and therefore container rotates, the fluid, and therefore vane tend to remain fixed with respect tot he rotation. The angle of rotation can therefore be measured by determining the amount the container has rotated with respect to the vane.

38 Claims, 10 Drawing Sheets

METHOD AND APPARATUS FOR A ROTATION ANGLE SENSOR

CROSS REFERENCE TO RELATED APPLICATIONS

The present application claims the benefit of priority of the filing date of U.S. Provisional Application No. 60/048,738, filed on Jun. 5, 1997, and of U.S. Provisional Application No. 60/062,336, filed on Oct. 15, 1997.

BACKGROUND

1. Field of the Invention

The present invention relates to motion sensors. More particularly, the present invention relates to sensing rotation and angular position in a body, even if the body is not rotating.

2. Background of the Invention

There are many applications where it is desirable to measure absolute angle or inclination. Examples include guidance and navigation systems, construction tools and equipment, and rollover protection devices for vehicles.

Various techniques have been implemented in the past to measure angle, including bubble-based inclinometers (based on the concept of a standard carpenter's level), pendulums, and accelerometers. Each of these technologies is capable of measuring angle. Undesirably, however, these technologies also produce output when subjected to linear acceleration. The automotive rollover application is a particularly good example because deployment of air bags and other safety measures is controlled in part by a rollover indication. It is highly undesirable for the sensor to indicate that the vehicle is rolling over when in fact it is accelerating or going around a corner (producing centrifugal acceleration) as such indication could trigger application of the vehicle's airbags.

Various techniques have been implemented or proposed in the past to avoid the problems due to linear acceleration. Each has its own disadvantage. Mechanical gyroscopes are capable of responding to rotation while rejecting linear acceleration. However, they are subject to drift problems and can be quite cumbersome, expensive, and fragile. Fiber optic gyros solve many of these problems, but respond to angular velocity, rather than absolute angle. Sensors which respond to angular velocity are useful in many applications, but when absolute angle is needed, such as detecting an unstable roll angle in a vehicle, a measure of the absolute angle is desired.

Other techniques such as tuning fork assemblies (see "Detection of Incipient Rollovers Grows in Importance", Automotive Engineering, September 1997, pp. 94–96 ("Automotive Engineering")) and Faraday-effect devices (see U.S. Pat. No. 3,940,983, "Faraday effect fluid flow and direction indicator", to Greene ("Greene")) can be constructed at relatively low cost, but also provide angular velocity information, rather than absolute angle information.

Some conventional devices used multiple fluids in a cylindrical or spherical container (see U.S. Pat. No. 4,779,353, "Tool for measuring inclination and rotation", to Lopes, et al. ("Lopes") and U.S. Pat. No. 5,416,977, "Pitcb Sensor System", to Striffler ("Striffler")). Although theoretically providing absolute angle information, the devices are susceptible to failure (i.e., provide erroneous results) if there is mixing between the fluids or if the boundary layer between the fluids changes. Other devices exist which use fluids that move in response to angular velocity. Each has properties similar to the above described techniques. (see U.S. Pat. No. 4,361,040, "Integrating Angular Accelerometer", Taplin, et al. ("Taplin"), and U.S. Pat. No. 4,163,325 "Verticality Sensors", to Hughes ("Hughes")).

To provide an estimate of absolute angle, hybrid sensor approaches have been proposed and implemented. One common technique used in automotive rollover applications is to combine an accelerometer (or other gravitationally-sensitive device) with an angular rate sensor (see Automotive Engineering). Static angle measurements are made whenever the vehicle appears to not be undergoing acceleration (e.g., when the measured acceleration is 1.0 G, the acceleration due to gravity). Based on this reference static angle, the output from the angular rate sensor is integrated to produce an estimate of absolute angle. Although this approach can be accurate when the vehicle is relatively stable, and when any rotation is high in angular velocity, it is prone to significant errors in integration. The integration problem is more acute where integration needs to be performed for a significant amount of time (a second is often significant). In this case, if there is even a small offset in the output of the angular rate sensor, the integration will have a cumulative error which grows larger with time.

Thus, it would be preferable to have a sensor which provides no cumulative angle measurement error, and which can measure absolute angle regardless of the linear acceleration experienced by the device.

SUMMARY OF THE INVENTION

The present invention is directed to a rotation sensor for, measuring rotation and angular position in a body, even if the body is not rotating. Preferably the rotation sensor is constructed of a fluid-filled container. As the container is rotated, the fluid tends to remain stationary. However, when the container is subjected to gravity or linear (non-rotational) accelerations, the fluid tends to move with the cylinder. Using the apparatus and method of the present invention, the relative motion of the container with respect to the fluid is measured.

In a preferred embodiment, the container is a cylinder. A set of one or more freely rotating vanes is rotatably disposed within the cylinder. The vanes are mounted on a shaft and are free to move with the fluid. As the cylinder is rotated, therefore, the rotating vanes tend to remain stationary with respect to the fluid, and hence rotate with respect to the cylinder.

Another preferred embodiment of the present invention can be used to detect rotational velocity. In this preferred embodiment a flexible cantilever is fixably attached at one end to the cylinder. The larger the angular rate of the cylinder, the larger the deflection of the cantilever.

The position of the cantilever or of the rotating vane(s) provides an output indicating the rotation of the cylinder. Several embodiments are described for using the position of the cantilever or rotating vane(s) to produce an output indicative of the rotation of the cylinder.

One embodiment uses an LED or other light source to shine on the vane or cantilever. One or more photodetectors are used to receive the light. The light source and photodetector(s) are arranged such that the position of the cantilever or vane modulates the amount of light received by each photodetector. This embodiment requires that the fluid be transparent with respect to the lights.

Another embodiment uses two or more electrodes and measures the electrical impedance between the electrodes. The electrodes are positioned such that the position of the cantilever or vane modulates the impedance between the electrodes. This embodiment requires that the fluid not be a perfect conductor of electricity.

In another embodiment, a cam is fixed to the vane or cantilever. The position of the cam modulates the light transmission or electrical impedance between two points to produce an output indicative of the rotation angle of the cylinder.

Another embodiment uses an optical fiber attached to the vane or cantilever. The optical fiber is positioned so that as the cantilever or vane moves, the amount of light through the fiber changes, or the direction of the light shining through the fiber changes. The change in the amount of light through the fiber or the direction that the light travels through the fiber is indicative of the rotation angle of the cylinder.

The output of the means for measuring the rotation of the cylinder may be passed through mathematical filtering to correct for the non-idealities of the device. These non-idealities are caused because the fluid begins to move to some extent with the cylinder. Causes of this fluid movement include friction along the inside surface of the cylinder, relative motion of the cantilever or vanes through the fluid, and because the measuring device may not deflect linearly with rotation. This mathematical filtering is implemented by creating an inverse model of these non-idealities.

These and other objects of the present invention are described in greater detail in the detailed description of the invention, the appended drawings and the attached claims.

DETAILED DESCRIPTION OF THE PREFERRED EMBODIMENTS

The present invention is a rotation angle sensor that can be used. in a variety of applications. Such applications include, but are not limited, to a) a rollover sensor in a vehicle (e.g., an automobile) that senses when the vehicle rolls and triggers deployment of occupant protections devices, such as air bags, in the event of a rollover accident, b) in measurement tools for dynamically measuring inclination and level for construction operations, and c) in various air, water, and space platform navigation and attitude control systems and guidance systems. A rotation angle sensor is referred to herein alternately as a rotation sensor, a rotational sensor or a rotational angle sensor.

Unlike conventional systems, the present invention does not rely on inertial masses or high quality bearings to allow a mass to rotate freely. Rather, a lightweight vane immersed in a fluid is used. The inertial properties of the liquid provide the principles of operation, not the properties of an inertial mass. The force of the liquid on the lightweight vane is much greater than frictional forces for any reasonable bearing, thus making the present invention relatively insensitive to bearing type or quality. Due to these properties, there is no requirement for neutrally-buoyant materials in the construction of the device, which greatly reduces the constraints on material and fluid selection.

Figure 1:
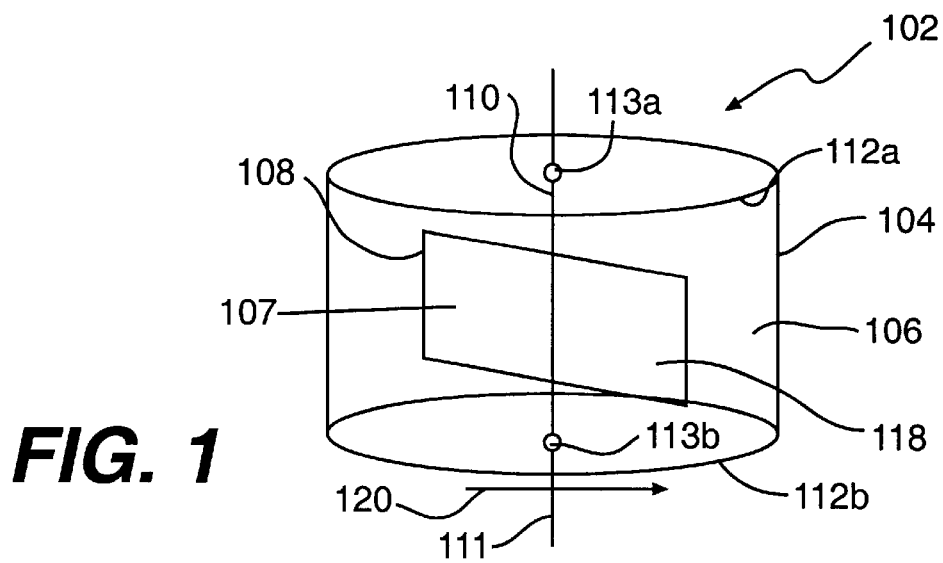
FIG. 1 illustrates schematically a preferred embodiment of a rotation angle sensor according to a preferred embodiment of the present invention.

FIG. 1 illustrates schematically a preferred embodiment of a rotation angle sensor 102 according to a preferred embodiment of the present invention. A rotation sensor 102 includes a container 104 filled with a fluid 106. Preferably container 104 is a cylinder and will be referred to herein as cylinder 104. A vane 107 is rotatably mounted in cylinder 104. Preferably, vane 107 is mounted to a shaft 110. Shaft 110 extends through a center axis 111 of cylinder 104. Shaft 110 preferably has pointed ends 112a and 112b. Any container which can hold a fluid can be used in the present invention. However, it is preferable to use a cylindrical container such as cylinder 104. In a preferred embodiment shaft 110 is made of stainless steel.

For optimum performance, it is desirable that fluid 106 have a low viscosity and a high mass compared to the density and mass of vane 107. It is also desirable that fluid 106 show little variation of viscosity or density with temperature. When using optical (and/or laser) detection means, fluid 106 should have good transparency properties. In the preferred embodiment, fluid 106 is water. It would be apparent to those skilled in the art that fluids other than water having the desired characteristics can be used. For example, where there may be extremes of temperature, where water might freeze or boil water may not function properly, and another material may be used.

To reduce friction caused by the shaft, the ends are preferably held by jeweled bearings 113*a* and 113*b*. Preferably jeweled bearings 113*a* and 113*b* have a bore or notch. In the preferred embodiment, pointed ends 112*a* and 112*b* of shaft 110 are inserted into the bore of jeweled bearings 113*a* and 113*b* respectively. Jeweled bearings 113*a* and 113*b* are preferably fixably attached to the inside surfaces of the top 177*a* and bottom 117*b* of cylinder 104.

The foregoing embodiment of rotation sensor 102 allows vane 107 to rotate substantially freely with respect to cylinder 104. This is because fluid 106 tends to keep vane 107 in place, even when cylinder 104 rotates. Assuming there is no friction between the inside surface of cylinder 104 and fluid 106, cylinder 104 can rotate (e.g. in the direction indicated by arrow 120) about its center axis 111 without causing vane 107 to rotate. Because vane 107 is fixed with respect to cylinder 104 rotation, the amount of rotation of cylinder 104 can be measured. Rotation measurements using the apparatus of the present invention are described below.

In embodiments of the present invention using photodetection of light reflected by the vane to photodetectors, vane 107 is on one or both sides coated with a reflective coating 118. Detection and processing of a signal resulting by using the present invention will be described below. Preferably, vane 107 is made of a material which is a diffuse scatterer of light, such as white-dyed polyethylene. Alternatively, the vane 107 can be coated with a reflective coating, e.g., white paint. Preferably, the reflective coating 118 covers the entire surface or surfaces of cane 106. Alternatively, reflective coating 118, covers only a portion of the surfaces of vane 107. Further, in the preferred embodiment, reflective coating 118 is put on both surfaces of vane 107. Alternatively, reflective coating 118 is put on only one surface of vane 107.

Figure 2:
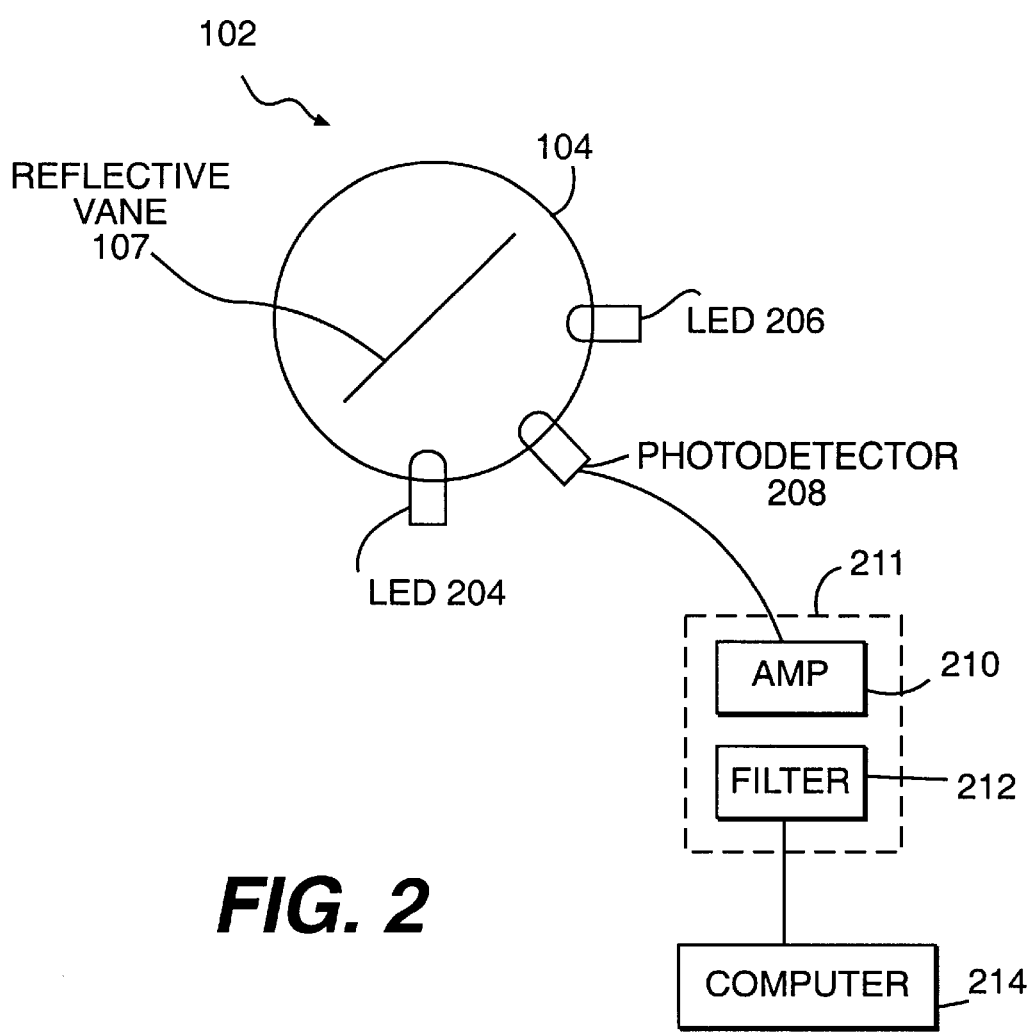
FIG. 2 illustrates schematically a preferred embodiment for implementing a rotation angle sensor according to the present invention.

Several configurations can be used for determining the rotation of cylinder 104 using the position of vane 107. FIG. 2 illustrates schematically a for implementing rotation angle sensor according to a preferred embodiment of the present invention. Referring to FIG. 2, a top view cutaway of rotation angle sensor 102 is shown. The implementation illustrated in FIG. 2 shows two light emitting diode (LED) light sources 204 and 206 and a photodetector 208. Preferably the LEDs 204 and 206 shine a light on a vane 107. Because of the reflective coating, light reflects off of vane 107 as reflected light. Different amounts of light will be reflected depending on the orientation of vane 107 and which LED 204 or 206 was activated. That is, the orientation of vane 107 effectively modulates reflected light. A photodetector 208 receives the reflected light.

Photodetector 208 converts the received light to a voltage in a well-known manner. The voltage is amplified in amplifier 210 in a well-known manner and passed to anti-aliasing filter 212. Anti-aliasing filter is a conventional low-pass anti-aliasing filter. Anti-aliasing filter 212 transmits its output to a computer 214 for further processing to determine the amount of rotation of cylinder 104 with respect to vane 107.

In the preferred embodiment, amplifier 210 and filter 212 are combined in an active filter, represented by dotted line 211. In the preferred embodiment, computer 214 is a conventional microcontroller. Microcontrollers for use in the context of the present invention are well-known to those skilled in the art. It would be apparent to those skilled in the art that other computational devices can be used to determine the rotation angle as described herein.

Computer 214 also controls the activation of LEDs 204 and 206. Because there is only one photodetector, photodetector 208 the LEDs must alternate activation. Computer 214 controls this alternate activation. In the preferred embodiment, power is saved because the LEDs are not activated all. the time. Not only are the LEDs activated alternately, but only active for short periods. Preferably, photodetector 208 is sampled 50 times a second. This means that LEDs 204 and 206 must each, in turn, be illuminated, and the light from each must be measured by photodetector 208, within 20 milliseconds. In the preferred embodiment, LEDs 204 and 206 are activated for only 3 to 4 milliseconds.

Based on the amount of light received by photodetector 208 while LED 204 is active and then when LED 206 is active, the computer determines the angle of rotation. Several methods can be used by computer 214 to calculate the amount of rotation given the values corresponding the amounts of light received by photodetector 208. A first method is simply a look-up table of values. That is, a two-dimensional table of values corresponding to angles of rotation is stored. The angles of rotation are accessed by using the values of light received, after they have been appropriately converted to integers. The look-up table rotation values are determined by actually setting vane 207 at a known rotation angle respective to the cylinder and measuring the amount of light received when LED 204 is active and when LED 206 is active. This is then repeated at a number of angles. The more angles, the more precise the look-up table, but at the expense of a larger look-up table. For more precise estimates, well-known forms of interpolation may be used to interpolate to the actual values of received light, where they do not convert to and exact integer. Such interpolation is well-known to those skilled in the art.

Another method for determining the angle of rotation is to model the output of rotation sensor 102 using a polynomial model. For example, well-known curve fitting techniques can be used to fit the amounts of light received when LEDs 204 and 206 shine on vane 207 at a particular angle. Then, in actual use, the amount of light received by the LEDs 204 and 2106 can be input to the resulting polynomial model to estimate the amount of rotation.

The foregoing methods for determining the rotation angle are expensive in terms of computation time and/or memory usage. For this reason, the preferred embodiment of the present invention uses a different method for determining the rotation angle.

Figure 3:
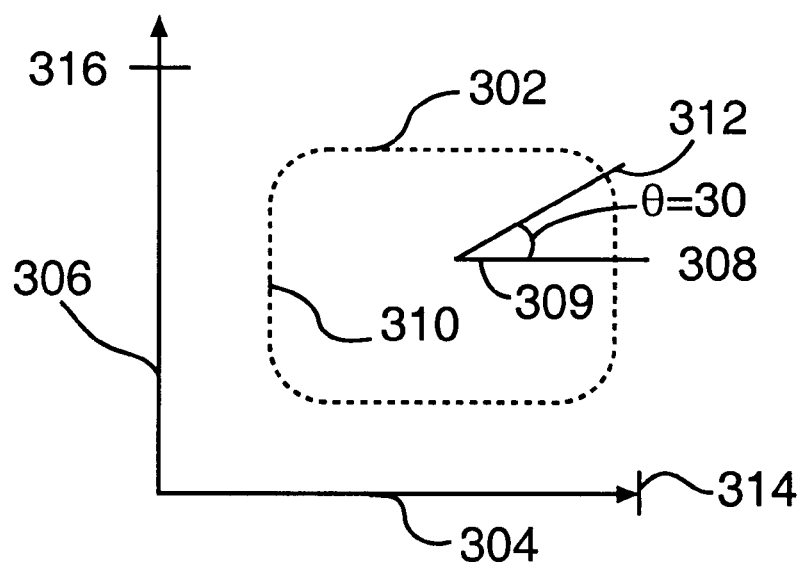
FIG. 3 illustrates graphically an exemplary sensor output space.

The preferred embodiment makes use of the fact that as vane 207 turns, there is a path in the sensor output "space" that it follows. The sensor output space can be illustrated graphically by plotting the output of photodetector 208 when vane is set at various angles relative to cylinder 104. Referring to FIG. 3, in a preferred embodiment, the graph will have as its abscissa 304 the amount of light received (output of photodetector 208) as a result of activating one of the LEDs, for example LED 204. The ordinate of the graph 306 will be the amount of light received (output of photodetector 208) after the other LED is activated, for example LED 206. Point 308 is the output where vane 207 has not rotated. Point 308 is also defined as the zero angle of the sensor output space. A line extending out from the center of the curve defined by the sensor outputs through the point 308 is defined as the zero-degree line 309 of the state output space. Preferably, all angles measured in the state output space are measured with reference to the zero-degree line 309. At point 310, vane 207 has rotated 90 degrees. This would correspond to an angle of 180 degrees in the state output space, that is 180 degrees from the zero-degree line 309.

Curve 302 is generated by rotating vane 207 through 360 degrees and measuring the output at a number of point through the rotation. For example, outputs may be measured every 5 degrees. Curve 302 is then converted into a one-to-one correspondence between sensor output space angles and actual rotation angles as follows.

Each point on curve 302 can be thought of as subtending an angle theta ($\theta$) with zero-degree line 309. Angle theta is the angle subtended between a line formed with one endpoint at the center of the curve 302 and passing through the point on the curve in question and zero-degree line 309. For example, point 312 forms an angle of approximately 30 degrees with zero degree line 309. Angles for each of the point that was actually measured in creating curve 302 are determined and stored in a table, with the corresponding known angle for that measurement pair (the angle is known because vane 207 was set to various angles to create curve 302).

Figure 4:
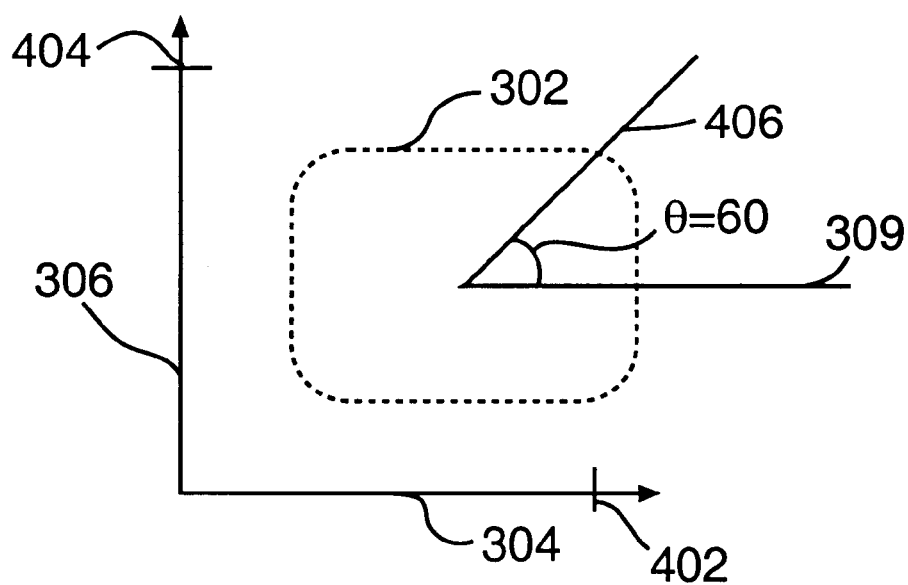
FIG. 4 illustrates graphically an operational use of a sensor output space.

FIG. 4 represents an operational use of a graph created as described above. In FIG. 4, the output of photodetector 208 after activation of LED 204 (corresponding to the abscissa 304), is represented by point 402. The output of photodetector 208 after activation of LED 206 (corresponding to the abscissa 304), is represented by point 404. These output values correspond to point 406 in the sensor output space. An angle, theta ($\theta$), can be calculated which corresponds to the angle subtended by a vector from the center of the sensor output space graph 302 through point 406 and the zero degree line 309. In the example of FIG. 4, the angle theta is calculated to be 60 degrees. This is the angle in the sensor output space. Using the look up table of angle measurements described above, the rotation angle is determined. If the angle corresponds exactly to one of the look-up table points, that is the rotations angle. If the angle does not correspond exactly, well-known interpolation techniques can be used to estimate the rotation angle.

In addition to using a look-up table, a one-dimensional fitted curve can be used to convert from the sensor space angle to the sensor angle. Using either the look-up table or the one-dimensional curve fit is more efficient than a look-up from two sensor outputs to sensor angle, because it is a look-up from one number (sensor space angle) to one number (sensor angle) rather than from two numbers (the two photodiode outputs) to one number.

Figure 5:
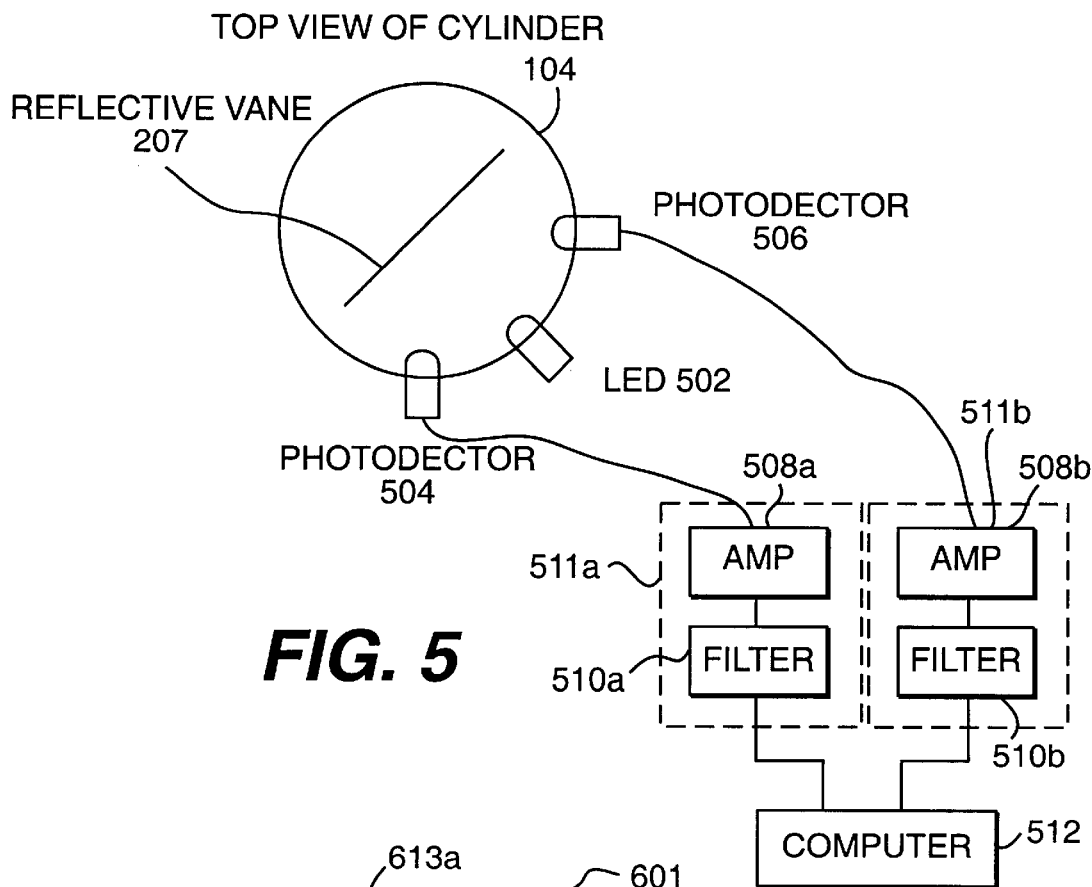
FIG. 5 illustrates schematically a rotation angle sensor according to another preferred embodiment of the present invention.

A second preferred embodiment for determining the amount of rotation of the cylinder 104 with respect to vane 107 is illustrated schematically in FIG. 5. Referring to FIG. 5, an LED 502 is activated as a light source to illuminate reflective vane 107 to produce reflected light. Two photodetectors 504 and 506 receive the reflected light and measure and provide a voltage indicative of its intensity. The voltage from photodetector 504 passes through an amplifier stage 508a and anti-aliasing filter 510a and digitized and stored in computer 512. The voltage from photodetector 506 passes through an amplifier stage 508b and anti-alissing filter 510b and digitized and stored in computer 512. In the preferred embodiment, amplifier stage 508a and filtering stage 510a are combined in an active filter, represented by dotted line 511a. Similarly, in the preferred embodiment, amplifier stage 508b and filtering stage 510b are combined in an active filter, represented by dotted line 511b.

Operation of the embodiment of the present invention as illustrated in FIG. 5 is analogous to that illustrated in FIG. 2. However, the embodiment illustrated in FIG. 5 does not require the timing considerations described above. Rather LED 502 is activated as required (50 times/second in the preferred embodiment). The light amounts represented by voltages are received by computer 512 and processed to determine rotation angle in the same way as the embodiment described in FIGS. 2–4, wherein the outputs from the photodetector 506 is analogous to the output of photodetector 208 after activation of LED 206, and the output of photodetector 504 is analogous to the output of photodetector 208 after activation of LED 204. The remaining computations are identical to those described above.

A disadvantage of this embodiment compared to the embodiment depicted in FIG. 2 is that two amplifier/filter pairs are required, rather than one.

Figure 6:
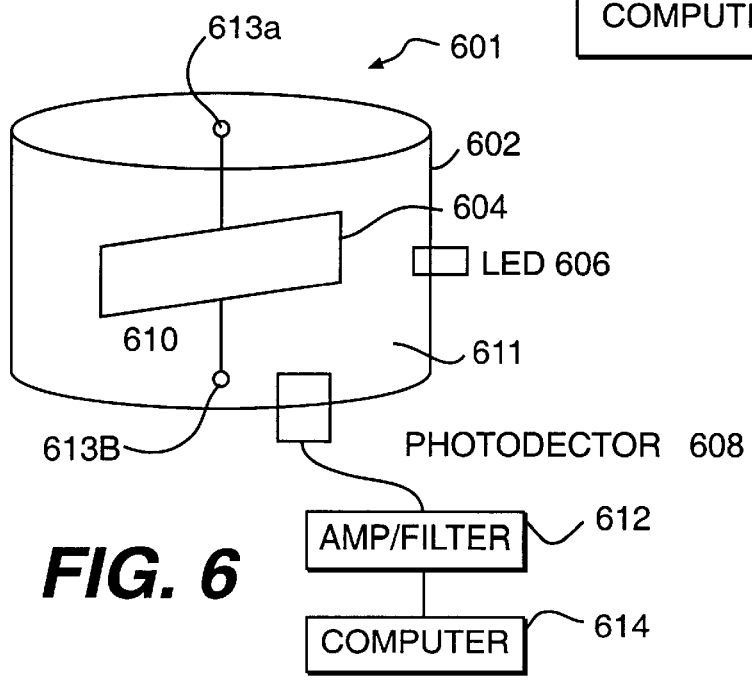
FIG. 6 illustrates schematically a rotation angle sensor according to another preferred embodiment of the present invention.

FIG. 6. illustrates schematically a rotation angle sensor 601 according to another preferred embodiment of the present invention. Rotation sensor 601 has a cylinder 602, vane 604, LED 606, photodetector 608 and shaft 610. Cylinder 602, vane 604, LED 606, photodetector 608 and shaft 610, are similar to the cylinder, vane, LED and photodetector illustrated in FIG. 2. Vane 604 is coated on one or both sides with a reflective coating as described above. Cylinder 604 is filled with a fluid 611 as described above. Preferably, shaft 610 is mounted to the object to be sensed using a jeweled-bearing mounting (described above) having mountings attached to the object at points 613a and 613b.

LED 606 is activated to shine light on reflective vane 604. Photodetector 608 receives light reflected from the reflective surface of vane 604 and converts the amount of the light so received to a voltage. The voltage is amplified and filtered by amplifier/filter 612. As described above, amplifier filter 612 can be a two stage process. The output of amplifier/filter 612 is sent to computer 614 where it is digitized for further processing. Alternately, the digitization can be done prior to sending the data to computer 614.

Using the output of amplifier/filter 612, computer 614 determines the angle of rotation of vane 604. Because there is only one sensor and light source, the considerations for processing two input described above are not present. Therefore, the computer processes the received signal using either a look-up table or a polynomial fit.

A look-up table for use in this embodiment of the present invention is generated by fixing the angle of rotation of vane 604, activating LED 606 and saving the corresponding voltage that is ultimately received at the computer 614, whether digitized or still requiring digitization. The look up table consists of the angle of rotation at the fixed location and the corresponding digitized light value. The process is repeated for an arbitrary number of rotation angles. The larger the number of locations (different rotation angles), the more accurate the table, however at the expense of larger table, which requires more memory to store. In operation, where the amount of light is not identical to a stored value, the look-up table values can be interpolated in a well-known manner to determine the angle of rotation. It would be apparent to those skilled in the art that the light values and/or look up table can be converted to integers to make processing more efficient. Well-known scaling and truncation techniques can be used for this purpose.

Alternatively, a polynomial equation can be derived for converting the amount of light received to an angle of rotation. This is performed using any of a number of well-known curve fitting techniques. For example, least squares techniques and cubic spline techniques can be used. A first order polynomial is used in the preferred embodiment, although there is no requirement that the polynomial be restricted to first order. It should be noted that a rotation angle sensor according to this embodiment of the present invention, although requiring fewer parts, has a more limited range of measurement than the embodiments of FIGS. 2 or 5. The range of measurement for this embodiment is 90 degrees unambigous range, as opposed to 180 degrees unambiguous range of the embodiments FIGS. 2 and 5.

Figure 7:
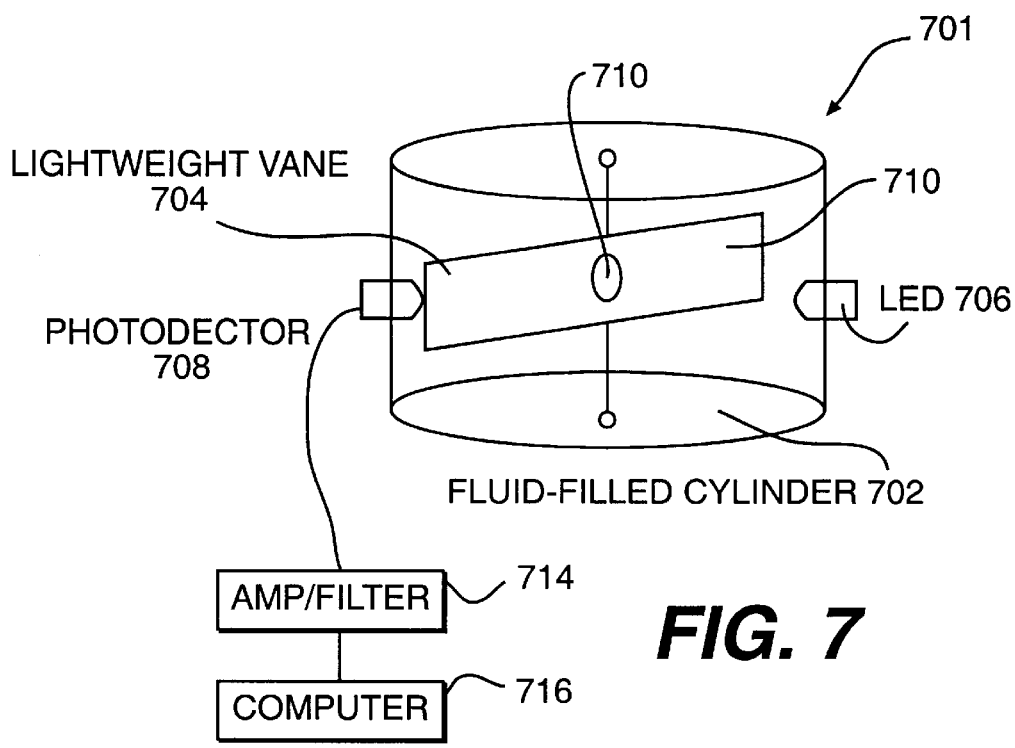
FIG. 7 illustrates schematically a rotation angle sensor according to another preferred embodiment of the present invention.

FIG. 7 illustrate schematically a rotation sensor 701 according to another preferred embodiment of the present invention. Rotation sensor 701 includes a fluid-filled cylinder 702, a vane 704, an LED 706, a photodetector 708 and shaft 712 rotatably remounted on jeweled-bearings 713a and 713b. Fluid-filled cylinder 702, a vane 704 ,an LED 706, a photodetector 708, shaft 712 and jeweled-bearings 713a and 713b are similar to those described above. Vane 704 is different in significant respects. First, there is no reflective coating required for vane 704. Second vane 704 has a hole 710 cut out of the center. Hole 710 permits light sourced by LED 706 to reach and be received by photodetector 708.

Light received by photodetector 708 is converted to a voltage. the voltage is passed through amplifier/filter 714. As described above, amplifier/filter 714 can be performed in two stages. The output of amplifier/filter 714 is sent to computer 716. The output can be digitized prior to or when received by computer 716. Such digitization is well know to those skilled in the art. These digitization techniques can be used in any of the embodiments described herein.

As vane 704 rotates the cross-sectional area of hole 710, as viewed from the perspective of photodetector 708 varies in size. Thus, the amount of light that passes through hole 710 and ultimately received by photodetector 708 varies. Using the amount of light received, computer 716 determines the amount of rotation. Preferably, this determination is made using a look-up table or a polynomial fit. The techniques have been described above with respect to FIG. 6 and need not be described again here. Those skilled in the art would know how to make and use the requisite look-up table or polynomial model based on the description provided herein. Those skilled in the art would also know that other techniques for determining the angle of rotation from the received amount of light are available and fall within the scope and spirit of the present invention.

In an analogous way to obtaining a 180-degree unambiguous measurement range by using two light sources or two photodetectors described above, the embodiment shown in FIG. 7 can be augmented with an additional LED/photodetector pair mounted, for example, 90 degrees from the pair 706/708, to disambiguate angle. The theory is the same as described for the embodiment shown in FIG. 2 and need not be repeated here.

Figure 8A:
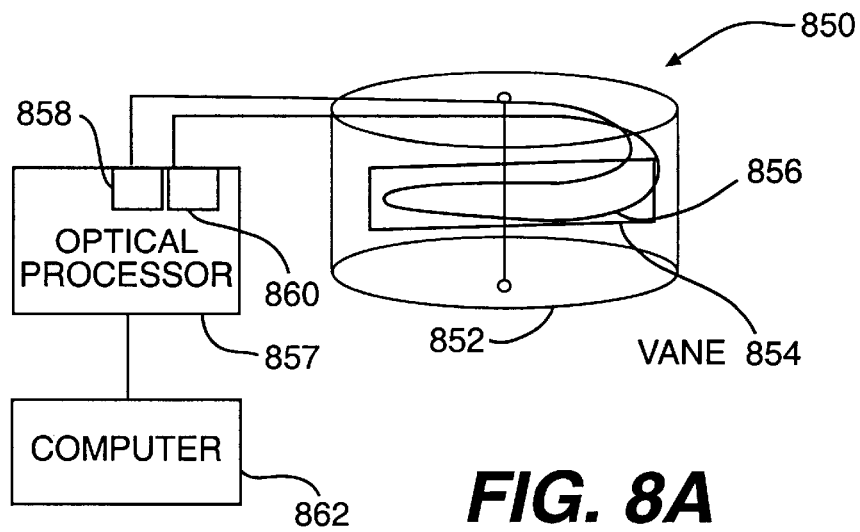
FIG. 8A illustrates schematically a rotation angle sensor according to another preferred embodiment of the present invention.
Figure 8:
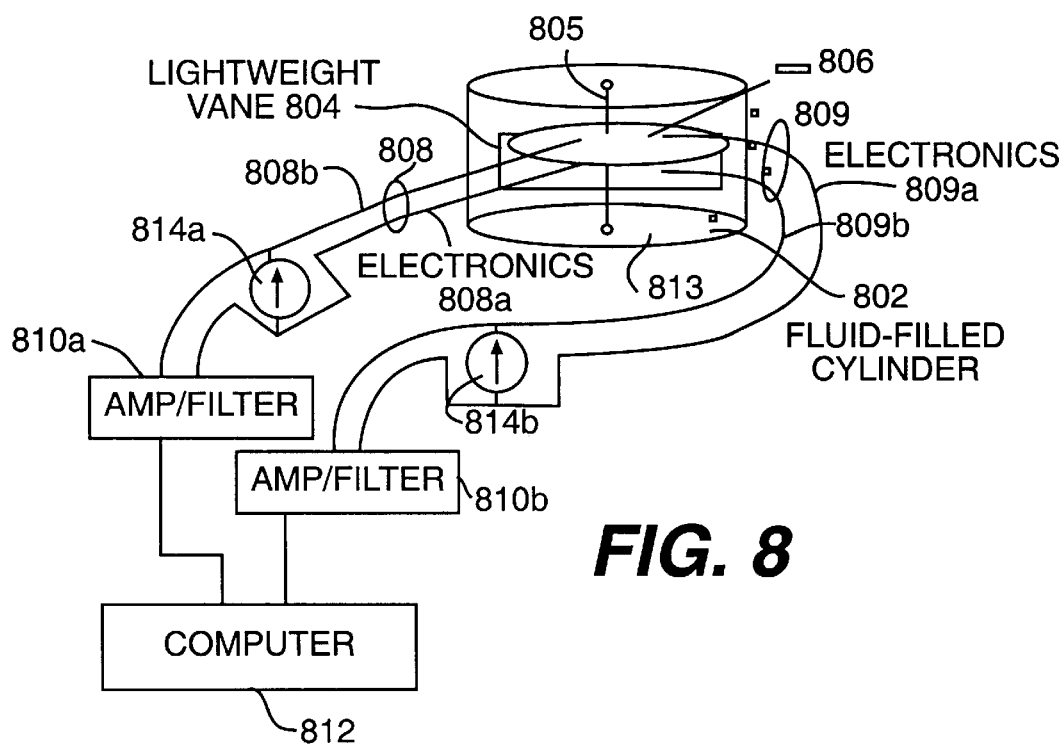
FIG. 8 illustrates schematically a rotation angle sensor according to another preferred embodiment of the present invention.

FIG. 8 illustrates schematically a rotation sensor 801 according to another preferred embodiment of the present invention. Rotation sensor 801 includes a fluid-filled container 802 (similar to those described above), a lightweight vane 804 (similar to those described above, though no reflective coating is required for the embodiment depicted in FIG. 8). Vane 804 is attached to shaft 805, which is rotatably attached to the object to be measured using jeweled-bearings 813a and 813b. Rotation sensor 801 also includes a cam 806, a 844 one or more pairs of electrodes 808 and 809 and a current source 814a and 814b of connected across each pair of electrodes. A first pair of electrodes 808 comprises electrodes 808a and 808b and a second pair of electrodes 809 comprises electrodes 809a and 809b. Preferably, the fluid 813 is not a perfect conductor of electricity.

In the preferred embodiment, cam 806 is a dielectric material that varies in diameter in a predetermined manner around the cam. In the preferred embodiment cam 806 is formed by using a circle of plastic attached to staff, but offset slightly from the center point. Alternatively cam 806 car vary in thickness in a predetermined manner around the cam. In the preferred embodiment, the dielectric material is polyethlyene or other type of plastic, but it would be apparent to those skilled in the art that other dielectric materials can be used. Preferably electrode pairs 808 and 809 are implemented such that one electrode of the pair is above the cam, and the other electrode of the pair is below the cam. As shown in FIG. 8, for example, electrode 808b of electrode pair 808 is above the cam and 808a of electrode pair 808 is below the cam. Likewise, electrode 809a of electrode pair 809 is above the cam and 809b of electrode pair 809 is below the cam. In this manner, a capacitor is formed, which has an impedance proportional to the amount of dielectric between the electrodes. If a partially-conductive fluid 813 is used (e.g., water), in addition to the capacitance between the electrodes, a modulated resistance is present and can be measured. If the capacitance is to be measured, current sources 814a and 814b should provide alternating current to produce a voltage input to amplifier 810; if resistance is to be measured, a direct current source can be used.

In the preferred embodiment cam 806 is fixably attached to vane 804 while the electrode pairs 808 and 809 are fixably attached to cylinder 802. Thus, as cylinder 802 rotates with respect to vane 804, electrode pairs 808 and 809 tend to rotate with respect to cam 806. Due to the varying thickness (or diameter) of cam 806, the amount of dielectric and therefore, the impedance between the electrode pair, varies. Because the thickness or diameter at each point around cam 806 is known, the impedance between the electrode pair at that point is known. The impedance in turn affects the voltage that is produced across the electrode pair. This voltage corresponds to the impedance, and therefore, the thickness or diameter of cam 806 at the point it is measured. Thus, location of the cam can be determined, from which the amount of rotation of cylinder 802 can be determined.

The voltages are amplified and filtered by amplifier/filters 810a and 810b. The outputs of the filters are sent to computer 812 for further processing to determine the amount of rotation of cylinder 802. As described above, the outputs of the amplifier/filters 810a and 810b can be digitized before reaching computer 812 or when they reach computer 812. Further, as described above amplifier/filters 810a and 810b can be performed in two stages.

A look-up table can be created which has the voltage which corresponds to the various locations on cam 806. The look up table is similar to those described above. The look-up table contains entries having the voltage and the corresponding angle of rotation (determined from the known location on cam 806). In operation, computer 806 can compare voltages to the voltages in the look-up table. If a voltage matches, the location on cam 806 is known exactly and the angle or rotation is read from the look-up table. If there is no matching voltage, well-known interpolation techniques are used to determine the amount of rotation.

Alternatively, the voltages in the look-up table can be converted to integer values. When a voltage is received by computer 812, the same conversion is performed. In this case the look-up table is indexed by the integer value. This allows more efficient retrieval of data, but makes interpolation more difficult.

An alternative embodiment to the LED/photodetector designs used above, an fiber optic measurement technique can be used to measure the position of the vane. FIG. 8A illustrates schematically a preferred embodiment of the fiber optic vane measurement device 850.

Referring to FIG. 8A, a side view of a fluid-filled cylinder 852 is illustrated. A vane 854 is shown rotatably attached to the cylinder 852 in a manner identical to the vanes described above. A loop of optical fiber 856 is attached to vane 854. In the preferred embodiment, the loop 856 is attached using an adhesive such as glue. The loop 856 is loosely attached to the inside of cylinder 852 such that vane 854 is free to rotate without impediment during rotation measurement as described above. For this to occur, the optical fiber 856 must be of a small gage (such as 125 micrometers) and covered only with a flexible, lightweight coating such as the plastic coating commonly used. The ends of the optical fiber forming loop 856 are attached to an optical processor 857. Optical processor 857 includes a light source 858 and a light intensity detector 860 such as a photodiode. The output of optical processor 857 is transmitted to a computer 862 to determine angular velocity.

Light source 858 outputs light having a known intensity. As the vane turns due to the angle of rotation sensor 851, the part of loop 856 between the attachment to cylinder 852 and vane 854 changes in radius of curvature. These changes cause the intensity of the light to change. Thus, the angle can be measured by measuring the changes in light intensity received by optical processor 857. In the preferred embodiment, this is done using lookup tables and/or polynomial fits. It would be apparent to those skilled in the art how to generate and use a look-up table or a polynomial fit based on the description of the present invention described herein.

Rotation of the sensor along an axis perpendicular to the axis of rotation of the vane can cause detrimental effects, because some of the fluid in the center of the cylinder will tend to rotate relative to the cylinder during such motions. If the vane is non-symmetrically oriented with respect to the perpendicular-rotating fluid, an undesired force will tend to erroneously move the vane.

If the cylinder in the above embodiments is oriented such that its axis is parallel to the earth (or other gravitational object), it can be used to measure inclination of an object to which it is mounted (e.g., roll or pitch). However, if the vane(s) are perfectly balanced, slow random rotations could occur during vibration, temperature change, or other environmental changes. To eliminate this drift, the vane(s) are imbalanced slightly. The gravitational effect will cause the vane to seek a consistent orientation.

Care must be used when imbalacing the vane(s) to take advantage of gravitational orientation. If the vanes are too lopsidely imbalanced, false readings can occur due to linear acceleration, although the response will be quite damped (literally) because the vanes will need to move against the fluid. By only imbalancing the vanes slightly however, gravity will cause a slow but useful tendency to orient properly. Because there is only a slight imbalance, there will be no noticeable response to other accelerations in many applications.

In the preferred embodiment, the imbalance is implemented by using differing lengths for each of the two sides of the vane, or inserting holes in one side. Other methods for imbalancing the vanes slightly to take advantage of the gravitational orientation effect would be apparent to those skilled in the art.

Figure 9:
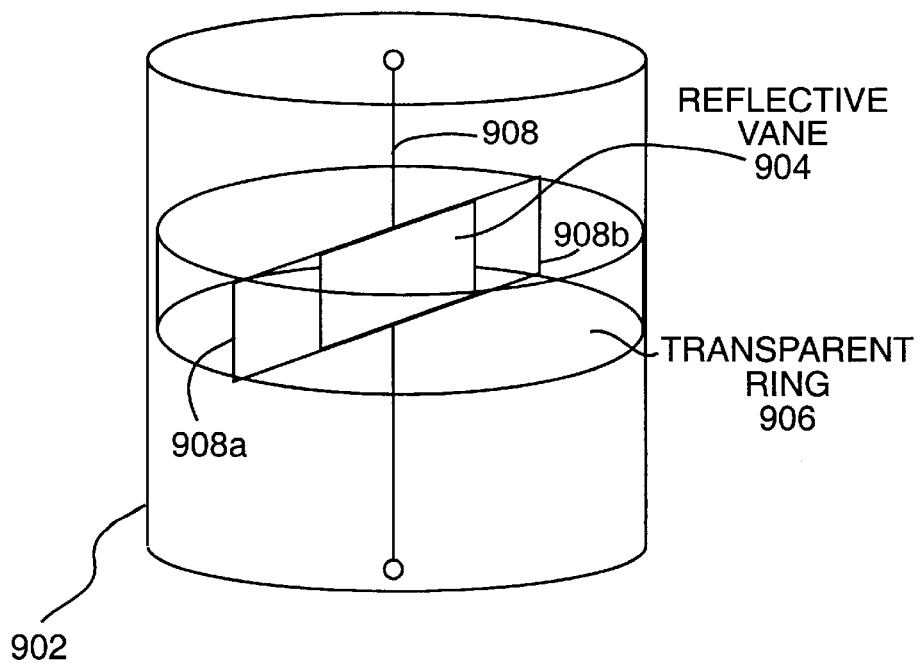
FIG. 9 illustrates schematically a preferred technique for reducing effects of off-axis rotation.

FIG. 9 illustrates schematically a preferred technique for reducing the effects of off-axis rotations. FIG. 9 shows a fluid-filed cylinder 902 having a reflective vane 904 attached thereto. In FIG. 9, the reflective area covers only a part of the surface of vane 904. Alternatively, the reflective material covers the entire surface of vane4 904, as described above.

To reduce the effects of off-axis rotation, vane 904 is attached a ring 906 at its ends 908a and 908b. Preferably, the ends 908a and 908b are attached using an adhesive such as glue. In the preferred embodiment, ring 906 is transparent so that light from an LED will be reflected to a photodetector in the as described above.

Ring 906 modifies the shape of the vane to be more symmetric with respect to off-axis rotations, reducing the net force acting to erroneously rotate the vane during off-axis rotation. The greater surface area resists motion of vane in the presence of lateral acceleration.

As described above, lateral acceleration can detrimentally affect the accuracy of a rotation sensor. For this reason, it is desirable to reduce and/or compensate for the effects of lateral acceleration. There are several preferred methods of reducing and/or compensating for the, some mechanical and some computational.

Figure 10:
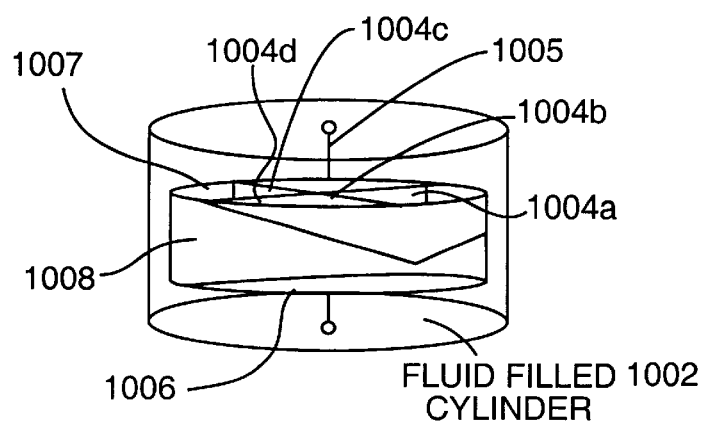
FIG. 10 illustrates schematically a rotation angle sensor according to another preferred embodiment of the present invention for decreasing the effect of lateral acceleration.

FIG. 10 illustrates a rotation sensor 1002 according to a preferred embodiment for decreasing the effect of lateral acceleration by increasing the surface area of a vane assembly in contact with the fluid. Referring tc FIG. 10, a fluid filled cylinder 1002 houses a vane having four panels 1004a–d. While increasing the number of panels increases the surface area of the vane in contact with the fluid, in and of itself, it also increases the complexity for determining the angle of rotation because light can reflect off of several panels. The panels are attached to a shaft 1005 which is rotatably attached to cylinder 1002 as described above.

To overcome this difficulty, a ring 1006 is attached to the ends of panels 1004a–d in a manned similar to that illustrated in FIG. 9A reflective material 1008 is placed on the outside of ring 1006. In this embodiment, ring 1006 additionally provides rejection of undesirable effects of off-axis rotation. In a preferred embodiment, the reflective material has a varying width around ring 1006. The varying width provides accurate location information on ring 1006. Alternatively, reflective material 1008 is placed on the outside surface of ring 1006 in a pattern encoding digital location information, e.g., numbers indicating location by degree from a reference point on ring 1006. To determine rotation angle in the case of the varying width implementation, the amount of light is detected by a photodetector (not shown) and processed by a computer (not shown) as described above. In the case of the digital encoding, the reflected light indicates a digital word indicating location. This digital word is read by a computer (not shown) to determine location. Such digital encoders/decoders are well-known to those skilled in the art.

Not only does ring 1006 simplify determining the rotation angle, but it gives the vane assembly 1007 a "waterwheel" configuration. The waterwheel configuration increases the surface area of vane assembly 1007 that contacts the fluid. As described above, increasing the surface area in contact with the fluid reduces the effects of lateral acceleration.

Figure 11A:
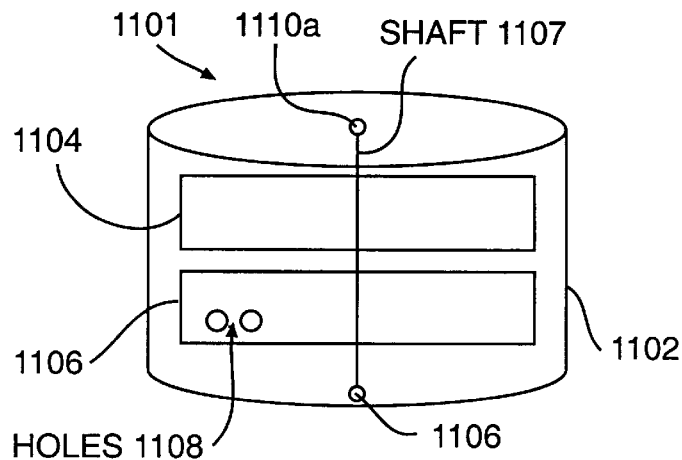
FIG. 11A illustrates schematically a rotation angle sensor according to another preferred embodiment of the present invention for compensating for effects of lateral acceleration.
Figure 11B:
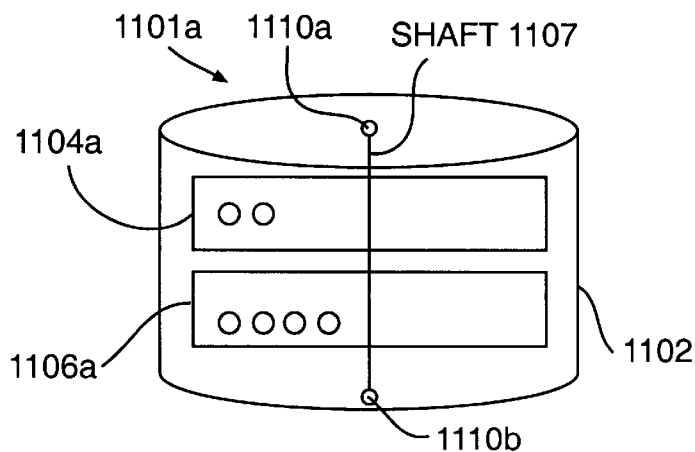
FIG. 11B illustrates schematically a rotation angle sensor according to another preferred embodiment of the present invention for compensating for effects of lateral acceleration.

FIGS. 11A and 11B illustrate preferred embodiments for compensating for the effects of lateral acceleration. The rotation sensors in FIGS. 11A and 11B are hybrid mechanical and computational solutions for compensating for lateral acceleration. Referring to FIG. 11A, a rotation sensor 1101 includes a fluid filled cylinder 1102 containing a first vane 1104 and a second vane 1106. Vane 1106 has holes 1108 drilled in it. Both vanes 1104 and 1106 are fixedly attached to shaft 1107. Shaft 1107 is rotatably attached to cylinder 1102 at points 1110a and 1110b preferably using jeweled-bearings. However, shaft 1107 has two parts, so that vanes 1104 can rotate independently of vane 1106.

In operation, when rotation sensor 1101 experiences lateral acceleration, vane 1104, will tend to move less than vane 1106. This is because holes 1108 increase the mass imbalance between the two sides of vane 1106, then by increasing the effect of lateral acceleration on it because the net torque on cane 1106 is greater. Where there is no lateral acceleration, both vanes should read the same value. Therefore, to determine the effect of lateral acceleration, the difference in the reading between vane 1104 and 1106 are determined, by a computer (not shown). The difference is then fed to a look-up table having entries containing pairs of associated lateral accelerations and difference values. The value of the lateral acceleration is then used to determine a compensation value to use to adjust the value of rotation given by vane 1104.

The look-up table is generated by exposing rotation sensor 1101 to various lateral accelerations and making entries containing associated pairs of difference value and lateral acceleration value. As described above, interpolation techniques can be used when the exact difference value is not found in the look-up table.

FIG. 11B illustrates schematically another preferred embodiment of a rotation sensor 1101a for compensating for the effects of lateral acceleration. Rotation sensor 1101a is identical to rotation sensor 1101 with the exception that it has holes in both vanes 1104a and 1106a. In this embodiment, both vanes have a significant mass imbalance. However they are affected by accelerations to different degrees because their mass imbalances are different. Imbalancing both vanes in this manner ensures that there will be a greater stabilizing force due to gravity on the vanes. This results in only minor rotational effects due to frictional forces from the viscosity of the fluid. As a result, mathmatical compensation (described below) for such forces can be simplified. In all other respects rotation sensor 1101a is used in the same manner as rotation sensor 1101.

Figure 12A:
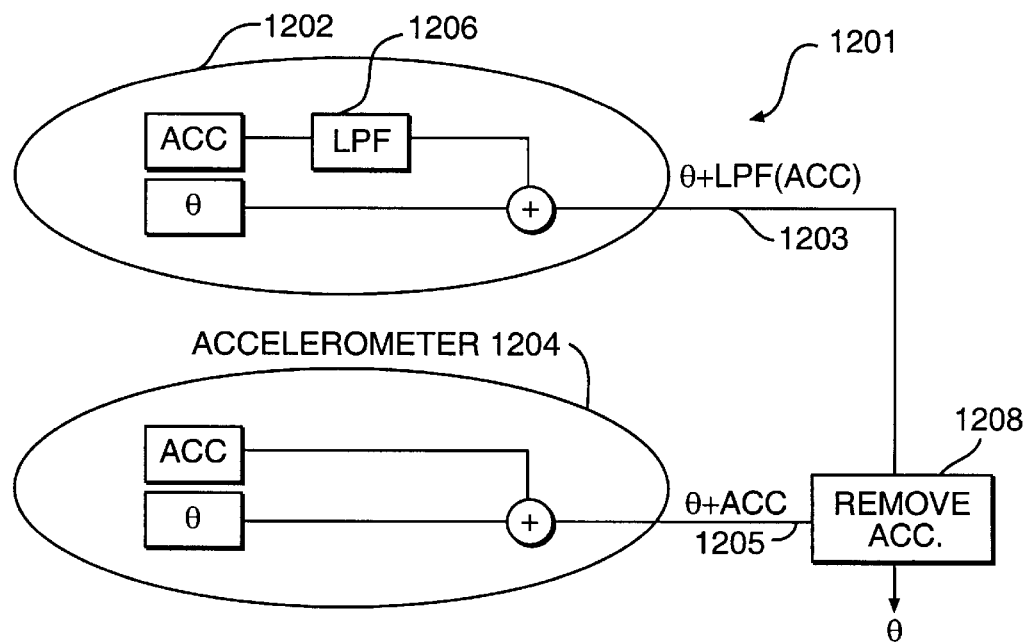
FIG. 12A illustrates schematically a circuit for compensating for effects of lateral acceleration in a preferred embodiment of the present invention.
Figure 12B:
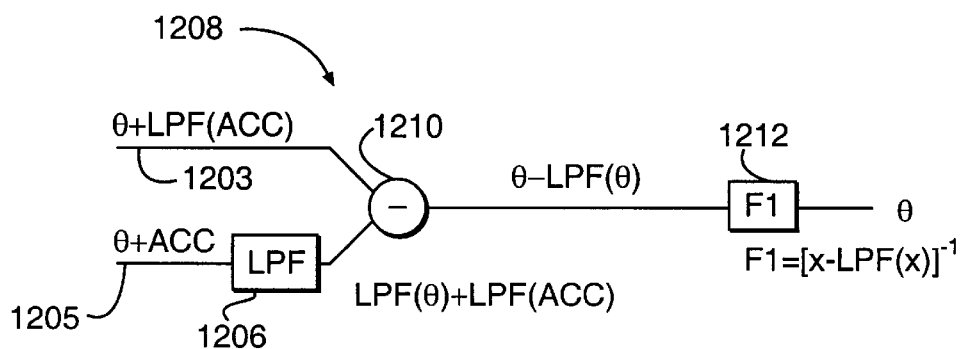
FIG. 12B illustrates schematically a circuit for removing effects of lateral acceleration in a preferred embodiment of the present invention.

The effects of lateral acceleration can also be accounted for computationally. FIGS. 12A and 12B illustrate schematically a circuit for compensating for errors due to prolonged lateral acceleration moving the vane through the fluid. The circuit illustrated in FIGS. 12A and 12B can be implemented in electronic hardware or in software. This undesirable effect can be modeled as a low pass filter. Referring to FIG. 12A, a circuit 1201 to remove the effect of lateral acceleration is schematically illustrated. The output 1203 of rotation sensor 1202 is modeled as a lateral acceleration passing through a low pass filter 1206 (LPF), which is added to the actual angle of rotation ($\theta$). LPF 1206 is a model of the transfer function of the response of the rotation sensor to the lateral acceleration. In the preferred embodiment, LPF 1206 is modeled as a second order butterworth filter. The coefficients of the butterworth filter are empirically determined through trial-and-error testing of the device until the filter output measures the output of the device to within a predetermined tolerance. The parameters will change per implementation of a rotation sensor according to the preferred embodiment of the present invention.

In the preferred embodiment, an accelerometer 1204 is used to measure the acceleration and actual angle of rotation ($\theta$). It would be well known to those skilled in the art that an accelerometer measures the angle of rotation, i.e., gravity, when it is not in motion. The output 1205 of accelerometer 1204 is a function of the angle of rotation and the later acceleration imparted to the cylinder of the rotation device. The effect of lateral acceleration is removed by an acceleration removal circuit 1208 to produce an estimate of the actual angle ($\theta$).

Referring to FIG. 12B a circuit 1208 for removing the effect of lateral acceleration is schematically illustrated. The output of the rotation sensor 1203 and the output of the accelerometer 1205 are input to acceleration removing circuit 1208. Accelerometer output 1203 is applied to the model of the rotation sensor to produce an estimate of the rotation sensor's affect on the lateral acceleration (acc). Assuming that LPF is a linear device its output will be the sum of filter response of the actual angle (LPF($\theta$)) and the filtered lateral acceleration (LPF (acc)). Subtractor 1210 subtracts the output of LPF 1206 and the output of the rotation sensor 1203 to remove the effect of the acceleration LPF(acc), i.e., the LPF(acc) terms cancels out due to the subtraction in subtractor 1210. The output of subtractor 1212 is then input to a filter F1. Filter F1 is a filter having a response that is the inverse of subtracting a low-pass-filtered signal from itself. This filter acts somewhat similar to a high pass filter.

Care must be taken to ensure that filter F1 is stable. F1 may not be stable because there is little signal with which to work where there is very low frequency angular activity. This is because 0–LPF(0) is near zero. As an alternative to a purely numerical filter, F1 can be augmented with heuristic knowledge. For example, one heuristic can be that if the input to F1 is low in value compared to the outputs of the accelerometer and rotation sensor, the rotation sensor is being subjected primarily to acceleration, so the gain of the filter can be reduced. Another heuristic can be that if the inputs from the accelerometer and rotation sensor are very close in value, the rotation sensor is being subjected primarily to rotation. In this case, the parameters of the filter, F1, can be modified to output more of the pure rotation sensor signal with less of the filtering action.

An alternative preferred embodiment for the acceleration removing circuit 1208 is solution of a differential equation describing the effect of acceleration on the sensor. Solving such an equation can be done using techniques well-known to those skilled in the art. One simplified equation describing the effect of lateral acceleration is:

Let:
$\gamma$=angle of vane with respect to earth (the error in sensor output due to acceleration)
$d\gamma/dt$ =the time derivative of gamma
$d^2\gamma/dt^2$=the second time derivative of gamma
g=gravitational acceleration due to the earth
$a_v$=vertical component of acceleration
$a_h$=horizontal component of acceleration
k1=constant proportional to the mass imbalance between the two halves of the vane in the fluid
k2=constant indicating the drag coefficient of the vane in the fluid.

$$d^2\gamma/dt^2 = -k1(g+a_v)\sin(\gamma) - k1 a_h \cos(\gamma) - k2 d\gamma/dt$$

Using one accelerometer to measure the components $a_h$ (if it can be assumed that the sensor is operating near 0 degrees) or two accelerometers to measure the components of $a_h$, g, and $a_y$, this equation can be solved to find the error due to acceleration, which is then subtracted from the sensor output.

A further alternative embodiment of the "Remove Acc." operation depicted in FIG. 12b is to use a Neural Network processor to combine the signals from the accelerometer and the rotation sensor. The Neural Network would be trained in a variety of acceleration and rotation examples to automatically learn to remove the lateral acceleration effects from the sensor signal and produce a correct angle output. It would be apparent to those skilled in the art how to configure and train a Neural Network given these inputs and outputs.

In some applications, it is preferable that the rotation sensor of the present invention be made very small. For example, rotation sensors for use in automobile applications should have diameters on the order of one-half inch. Other applications can require micromachined sensors having diameters on the order of microns or less. A problem with very small sensors however, is that there will be a tendency for the fluid to begin to rotate with the cylinder due to friction. When rotated rapidly or for extended periods of time, these frictional forces exert a torque on the fluid, and eventually the liquid can begin to rotate to a measurable extent. The rotation of the fluid will of course cause the vane to rotate and create an output error from the rotation sensor. This same phenomenon can arise in cases in which viscous fluids are used. In many cases, the effects of friction need to be reduced as much as possible for accurate results.

Figure 13A:
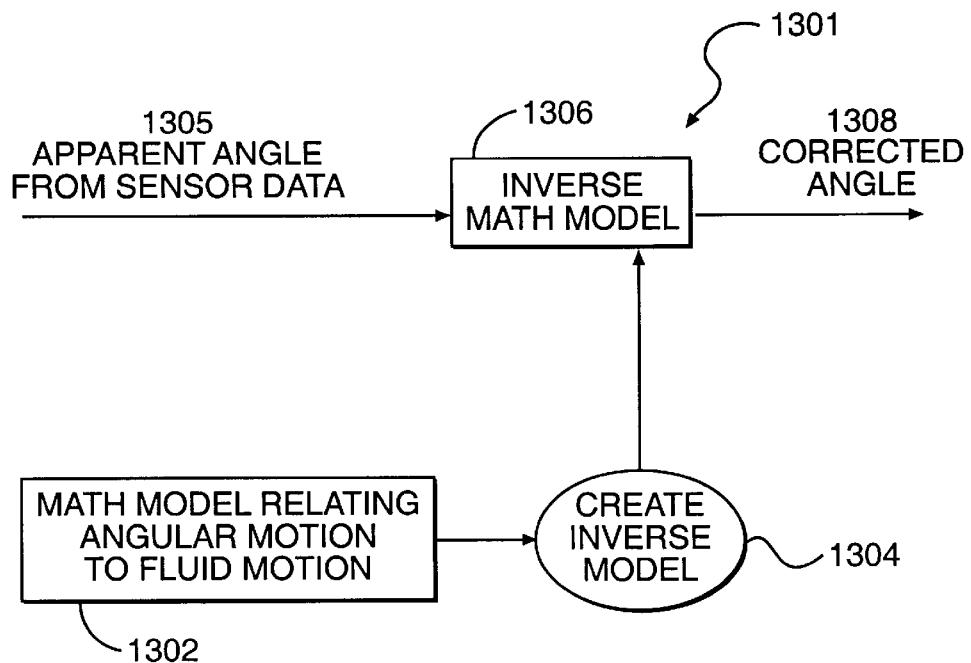
FIG. 13A is a method for compensating for friction in a preferred embodiment of the present invention.

The effect of friction can be compensated for by the method 1301 illustrated in FIG. 13A. Referring to FIG. 13A, a mathematical model of the rotational sensor output is created in step 1302. One method of generating the model is to use data from an actual sensor. The data can be curve fit to generate the model. Another method to generate the model is to use data from a theoretical model of the sensor. In either case, the model predicts the sensor output based on the rotation of the cylinder. In step 1304, an inverse model of the model is created using known techniques. The inverse model converts sensor readings into corrected angle readings. In actual use, for example, in step 1306, apparent data 1305 from a rotation sensor is input to the inverse model and a corrected angle 1308 is output from the inverse model.

An example model and its inverse according to a preferred embodiment of the present invention follows. In the model it is a simplification to assume that the fluid can be approximated by a column in which all of the fluid rotates at the same angular velocity. Then a differential equation can be written which can be solved for the angular position of the cylinder (and hence, the object to which the sensor is attached)

In the model:

$\theta$=angular position of the fluid, $\Phi$=be the angular position of the cylinder (corrected angle), $F(\theta,\Phi)=\alpha$=the output (apparent pr measured angle) of the rotation sensor, $dx/dt$=the time derivative of x, and $d^2x/dt^2$=the second derivative.

Assuming that the force on the fluid is proportional to the angular velocity difference between the cylinder and the fluid, the angular force or $d^2\theta/dt^2$ $$d^2\theta/dt^2 = k(d\Phi/dt - d\theta/dt),$$

or equivalently, $$d^2\theta/dt^2 = k1(d\Phi/dt - d\theta/dt), \quad \text{(Eq. 1)}$$

or,
by integrating Eq. 1

$$d\theta/dt = k1((\Phi-\theta)) \quad \text{(Eq. 1.5)}$$

where k1 is a quantity that depends on various parameters including the radius of the cylinder, frictional forces, and the density of the fluid.

The sensor measures the relative angular position between the vane and the cylinder, $$F(\theta,\Phi) = k2((\Phi-\theta)) \quad \text{(Eq. 2)}$$

where k2 is a quantity relating the gain of the selsor. k1 and k2 can be determined empirically or can be determined by physical analysis.

Algebraic substitution of Eq. 1.5 into Eq. 2 yields:

$$F(\theta,\Phi) = k2(d\theta/dt/k1)$$

or $$\theta = \frac{k1}{k2} \int_0^t F(\theta,\phi)dt, \text{ or}$$

because from Eq. 2, $\Phi 1/k2\ F(\theta,\Phi))+\theta$. Thus, $$\phi = \frac{F(\theta,\phi)}{k2} + \frac{k1}{k2}\int_0^t F(\theta,\phi)dt. \quad \text{(Eq. 3)}$$

Figure 13B:
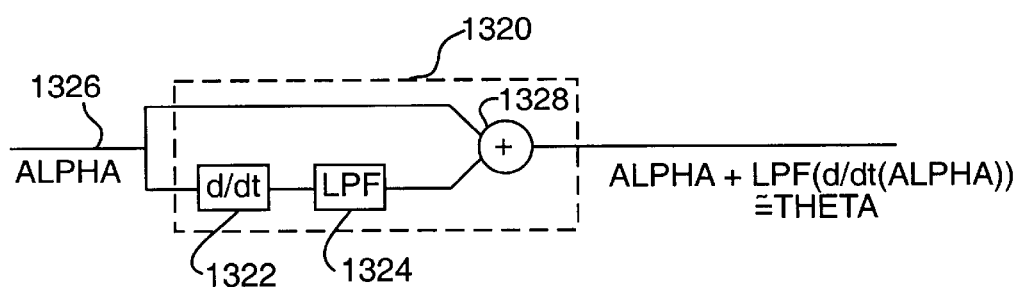
FIG. 13B illustrates schematically a circuit for compensating for friction according a preferred embodiment of the present invention.

With the properly selected values for k1 and k2, Eq. 3 provides an improved measurement of angle which corrects for the non-ideal effects due to viscosity or small diameter cylinder. The basic model, Eq. 1 can be improved to account for nonlinearities, rotational friction of the vane(s) on the bearings, temperature, etc., to obtain increasingly improved angular measurements Another embodiment of the inverse mathematical model 1306 is illustrated schematically in FIG. 13B. This model can be used if the frictional effect error is significantly less than the total output of the sensor. Referring to FIG. 13B, the output of rotation sensor 1320 is modeled. A significant source of friction is assumed to be proportional to the angular velocity ($d\theta/dt$). The inter-fluid frictional, viscous effects are approximated by a low pass filter 1324. Note that, in general, the response of low pass filter 1324 is not equivalent to the response of low pass filter 1206. The parameters of low pass filter 1324 are found by empirical analysis of data taken at various angular rates and angular accelerations In FIG. 13B, the inter-fluid frictional, viscous effects act on the angular velocity and are added to the apparent angle output by the sensor 1326 ($\alpha$). The sum is an improved estimate of the rotation angle taking into account the effects of friction of the fluid with the inside surface of the cylinder, as well as the viscosity of the fluid.

Figure 14:
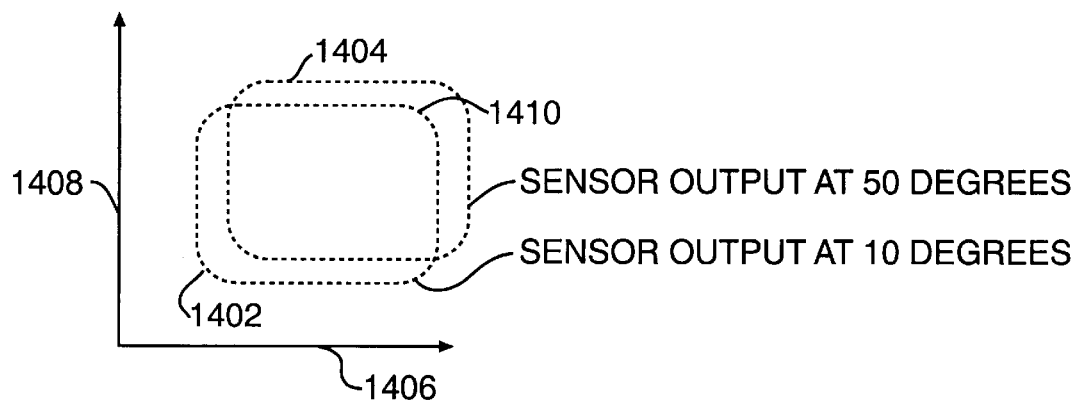
FIG. 14 illustrates graphically an exemplary sensor output space shift caused by varying temperature.

Another consideration which can be taken into account in a rotation angle sensor of the present invention implemented with two detectors (see, e.g., FIGS. 2 and 5) is compensation for temperature or other effects which change the detected signal levels. Such effects will affect both received signals in a similar way. Because both detectors are affected the same way, the entire sensor output space curve shifts. FIG. 14 illustrates a sensor output space shift for an increase in temperature. Initially, the sensor was at 10 degrees. The output space determined as described above, is curve 1402. At some time later, the temperature of operation increased to 50 degrees. This caused the output space to shift from curve 1402 to curve 1404. The curve shifts because the temperature change affects both measurements from both sensor output sources in the same way. The sensor output sources are either two photodiodes activated by one LED, or one photodiode activated by two LEDs as represented by the abscissa 1406 and ordinate 1408.

To compensate for such a temperature change, the sensor system notes where a particular measurement point lies in the sensor output space. If the measurement point does not lie on the curve, the sensor computer then determines approximately where the curve has shifted such that the measurement point will once again lie on the curve. Using this information, the computer determines a new center point for the sensor output space, from which rotation angle are to be computed. This substantially eliminates errors due to changing temperatures.

In the preferred embodiment, the reference point for determining the amount of shift is the point 1410, i.e., the point at a 45 degree angle from the center in the sensor output space. The reason is because both sensors are affected in the same way, the curve always moves along a 45 degree point. It is therefore highly unlikely that the new 45 degree point will align with any point on the old sensor output space curve resulting in an indication that there was no change in temperature. However, it would be apparent to those skilled in the art that any point in the sensor output space can be theoretically used because the chances of the reference point coinciding with the new curve is remote.

Angular Velocity Measurement

In some applications, such as vehicle rollover detection, it is desirable to measure angular velocity as a secondary parameter in addition to the absolute angle provided intrinsically by the sensor. In a first preferred embodiment, the computer described above is programmed to differentiate the angle measurements after they have been calculated as described above. It would be apparent to those skilled in the art how to perform the described differentiation given the angle calculations described above. One drawback to numerical differentiation in this manner is the effect of noise in the signal. For example, if low-cost components are used such that digitization of the output causes noticeable quantization (i.e., steps) in the output, the differentiation will contain corresponding noise (e.g., spikes) that are a side effect of the digitization, rather than the actual angular velocity. Higher-resolution digitization can be used to reduce quantization errors. However, because higher resolution digitization generally requires more costly components, another solution may be required where cost is a driving factor in the implementation of the rotation sensor.

Another technique is to use a logic process to detect and correct a substantial amount of the error due to quantization noise. To do this effectively, the sensor output must be sampled above the required frequency response of the system. Preferably the sample rate is approximately 4 to 8 times the frequency response of the system. In the preferred embodiment, the following logical rules are implemented:

a. If the values in a sample period toggle between two adjacent values, then the rotation sensor outputs zero angular velocity. This can occur for example where the output of the sensor is toggling between two "equivalent" values.

b. If approximately uniform steps in sensor output are observed throughout the sample period, then the rotation sensor outputs the slope, which is calculated from the observed angle measurements in a well known manner; and c. If non-uniform steps are observed over the sample period, then the rotation sensor adjusts the steps in the sample period between adjacent, "equivalent" values and selects the slope which gives the most uniform step size throughout the sample period.

As an alternative embodiment to further reduce the effects of quanitzation, the error can be reduced by differentiating the electronic signals from the photodiodes in the rotation sensor of the present invention. Doing so does not require an increase in the sampling resolution. It would be apparent to those skilled in the art that well-known analog differentiator circuits can be used to electronically differentiate the photodetector signals. This electronically-differentiated signal can be sampled at the same resolution on a different A/D channel as the angle. Electronic differentiation in this manner avoids quantization problems because the derivative is computed before the quantization. Electronic differentiation in this manner can often reduce the effects of quantization more than the logic method described above.

Figure 15:
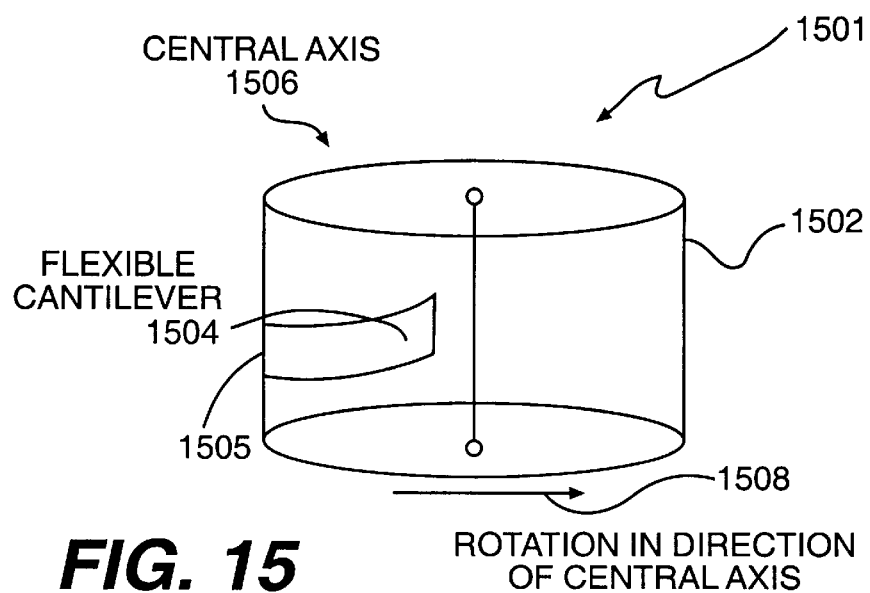
FIG. 15 illustrates schematically a angular velocity sensor according to another preferred embodiment of the present invention.

FIG. 15 illustrates schematically a rotation angle sensor 1501 according to a preferred embodiment of the present invention for mechanically measuring the angular velocity of rotation of the body to which the rotation sensor is mounted. Rotation angle sensor 1501 includes a fluid-filled cylinder 1502 (similar to those described above). In addition, rotation angle sensor 1501 includes a flexible cantilever 1504. Flexible cantilever 1504 is fixably attached on one end 1505 to the inside surface of cylinder 1502. In the preferred embodiment, flexible cantilever 1504 is attached using an adhesive such as glue.

Rotation of rotation angle sensor device 1501 causes flexible cantilever 1504 to bend. The amount of bend is proportional to the angular velocity of rotation. Greater angular velocities cause greater bends of flexible cantilever 1504. Therefore, angular velocity can be calculated by measuring the bend in cantilever 1504.

In the preferred embodiment, the angular velocity is calculated using look-up tables or polynomial fits. In the case of the look-up table, the amount of bend of flexible cantilever 1504 is measured and stored for a number of known angular velocities. That is, rotation angle sensor 1501 is rotated at a known velocity and the amount of bend in flexible cantilever 1504 is measured stored. In operation, the amount of bend actually measured is compared to those in the table. Where there is a match, the value corresponding to the observed bend is an exact measure of the angular velocity. Where there is not a match, well-known interpolation techniques can be used to estimate the value of the angular velocity from the known values in the look-up table.

In the case of a polynomial fit, the amount of bend of flexible cantilever 1504 is measured and stored for a number of known angular velocities. The data is then used to determine coefficients of predetermined polynomial. Techniques for determining the coefficients are well-known to those skilled in the art. In operation, the amount of bend actually measured is input as a parameter to the polynomial equation. The output of the polynomial equating is an estimate of the angular velocity.

Figure 16:
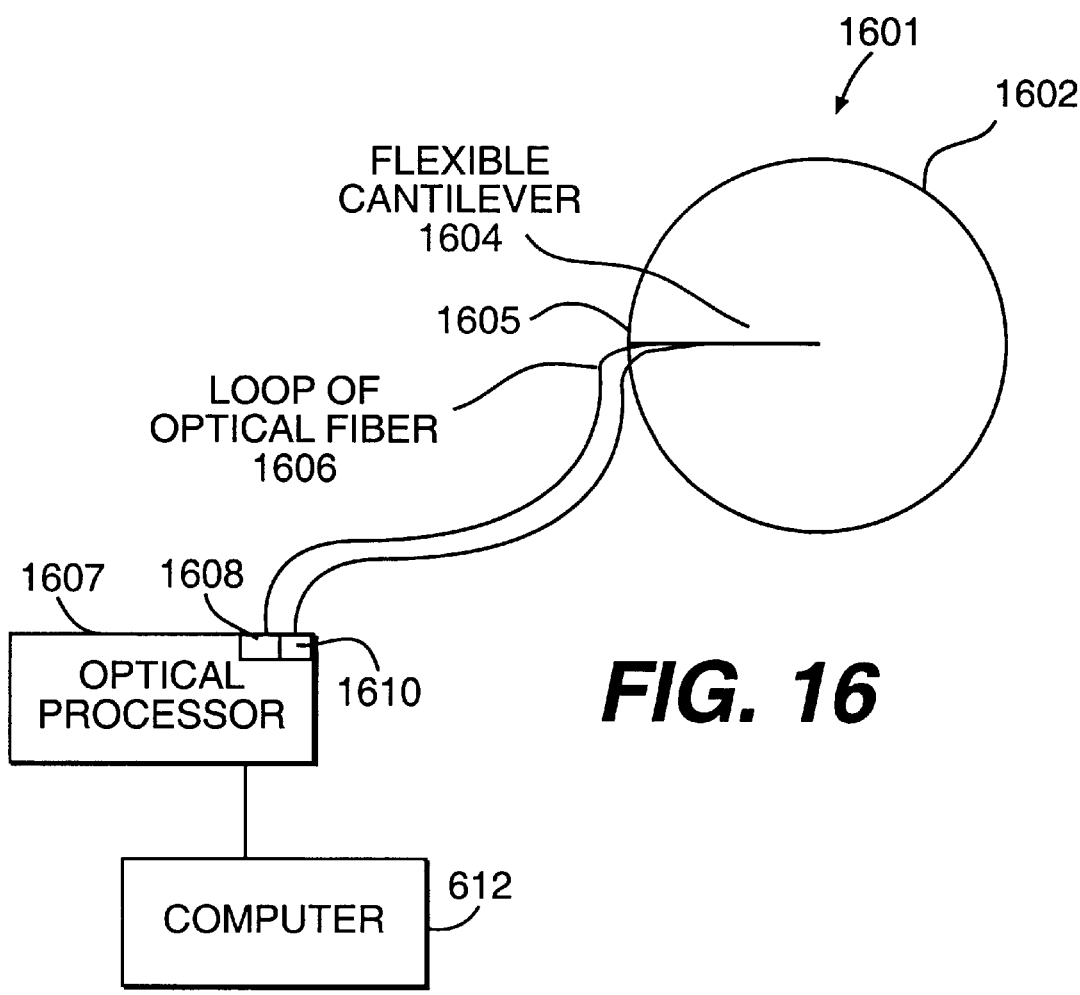
FIG. 16 illustrates schematically an angular velocity sensor according to another preferred embodiment of the present invention.

FIG. 16 illustrates schematically a preferred embodiment of a rotation angle sensor 1601 for measuring angular velocity. Referring to FIG. 16, a top cut away view of a fluid-filled cylinder 1602 is illustrated. A flexible cantilever 1604 is shown attached to the inside surface of cylinder 1602 at a point 1605. A loop of optical fiber 1606 is attached to flexible cantilever 1604. In the preferred embodiment, the loop 1606 is attached using an adhesive such as glue. The ends of the optical fiber forming loop 1606 are attached to an optical processor 1607. Optical processor 1607 includes a light source 1608 and a light intensity detector 1610. The output of optical processor 1607 is transmitted to a computer 1612 to determine angular velocity.

Light source 1608 outputs light having a known intensity. As flexible cantilever bends due to angular velocity of rotation angle sensor 1601, loop 1606 changes shape. These changes cause the intensity of the light to change. Thus, the angular velocity can be measured by measuring the changes in light intensity received by optical processor 1607. In the preferred embodiment, this is done using look tables and/or polynomial fits. it would be apparent to those skilled in the art how to generate and use a look-up table or a polynomial fit based on the description of the present invention described herein.

In an alternative embodiment, cantilever 1604 is made of a reflective material or coated with a reflective coating as in the vane embodiment depicted in FIG. 2. Equivalent LED and photodetector circuitry is used to obtain the deflection of the cantilever and techniques identical to that described above are used to calculate the angular velocity.

Any container which can hold fluid can be used in any of the embodiments described above. In the preferred embodiments, the container is a cylinder as described above.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A rotation angle sensor, comprising:
   (a) a fluid-filled container, having a top and a bottom; and
   (b) a vane connected to the top and bottom of said fluid-filled container via a shaft, so as to remain substantially fixed with respect to an axis of rotation and allowing the container to rotate freely about the vane, such that the vane remains substantially fixed as the container rotates about the vane.

2. The rotation angle sensor of claim 1, wherein said vane is imbalanced.

3. The rotation angle sensor of claim 1, wherein said vane diffusely scatters light by reflection, further comprising:
   a light source to illuminate said vane;
   a first light detector to detect light reflecting from said vane as a first light intensity measurement;
   a second light detector to detect light reflecting from said vane as a second light intensity measurement; and
   a computational device to determine a rotation angle using said first and second light intensity measurements.

4. The rotation angle sensor of claim 1, wherein said vane diffusely scatters light by reflection, further comprising:
   a first light source to illuminate said vane;
   a second light source to illuminate said vane;
   a light detector to detect light reflecting from said vane as a light intensity measurement, wherein light reflecting from said vane due to illumination by said first light source is a first light intensity measurement and light reflecting from said vane due to said second light source is a second light intensity measurement;
   means for alternating illumination of said vane by said first and second light sources; and
   a computational device to determine a rotation angle using said first and second light intensity measurements.

5. The rotation angle sensor of claim 1, wherein said vane diffusely scatters light by reflection, further comprising:
   a light source to illuminate said vane;
   a photodiode to detect light reflecting from said vane as a light intensity measurement;
   a computational device to determine a rotation angle using said light intensity measurements.

6. The rotation angle sensor of claim 1, wherein said vane has a hole, further comprising:
   a light source to transmit light through the hole;
   a light detector to detect light transmitted through said hole by said LED as a light intensity measurement;
   a computational device to determine a rotation angle using said light intensity measurements.

7. The rotation angle sensor of claim 1, further comprising:
   a cam fixably attached to said vane;
   one or more pairs of electrodes, each pair have a first electrode one side of said cam, and a second electrode on another side of said cam;
   a current source connected across each pair of electrodes; and
   a computational device to determine a rotation angle using an impedance measureable across each eletrode pair.

8. The rotation angle sensor of claim 1, further comprising:
   a fiber optic cable fixably attached to said vane to form a loop;
   an optical processor having a light source to send a pulse through one oend of said fiber optic cable and an optical detector to detect light intensity returning at the other end of said cable;
   and a computation device to determine rotation angle based on said light intensity.

9. The rotation angle sensor of claim 1, further comprising a transparent ring attached to said vane.

10. The rotation angle sensor of claim 1, wherein said vane comprises a plurality of panels.

11. The rotation angle sensor of claim 10, further comprising ring attached to said vane.

12. The rotation angle sensor of claim 11, wherein said ring has a relfective coating of varying width to indicate location on said ring.

13. The rotation angle sensor of claim 12, wherein said ring has a digital code to indicate location on said ring encoded thereon.

14. An angular velocity sensor, comprising:
   a sealed fluid-filled container; and
   a cantilever having one end fixably attached to an inside surface of said container, so that a bend of the cantilever can be measured when the container is subjected to an angular velocity.

15. The angular velocity detector of claim 14, further comprising:
   a loop of fiber optic cable attached to said cantilever.

16. A method for determining angle of rotation, comprising the steps of:
   (a) connecting a vane in a fluid filled container having a top and a bottom via a shaft so that the vane remains substantially fixed with respect to an axis of rotation;

(b) allowing the container to rotate freely about the vane, such that the vane remains substantially fixed as the container rotates about the vane; and (c) determining an angle of rotation of the cylinder from an initial point.

17. The method of claim 16, further comprising the steps of (b) alternating illuminating of said vain by between two light sources;

(c) detecting light reflected by the vane in response to illumination by each light source; and (d) determining the angle of rotation based on said reflected light.

18. The method of claim 16, further comprising the steps of:

(b) illuminating said vane by a light source;

(c) detecting light reflected from said vane; and (d) determining the angle of rotation based on said reflected light.

19. The method of claim 16, further comprising the step of:

(b) attaching a cam to said vane.

20. The method of claim 16, further comprising the step of:

(b) attaching a loop of fiber optic cable to said vane.

21. A method for determining angular velocity, comprising the steps of:

(a) mounting a cantilever in a fluid-filled container;

(b) measuring the amount of bend of said cantilever; and (c) determining the angular velocity in accordance with the amount of bend of said cantilever.

22. The method of claim 21, further comprising the steps of:

(d) attaching a fiber optic loop to said cantilever;

(e) sending a light through said loop;

(f) receiving said light as a received light; and (g) determining angular velocity in accordance with said received lights.

23. A rotation sensor for mounting in a vehicle to sense rotation of a vehicle about an axis, comprising:

a container filled with a fluid that is sealed to prevent flow of the fluid through the container;

a vane connected to a top and a bottom of the container so that the container can rotate freely about the vane via a shaft, the shaft defining an axis of rotation about which the rotation is sensed.

24. The rotation sensor recited in claim 23, wherein the vane is imbalanced.

25. The rotation sensor recited in claim 23, wherein the vane diffusely scatters light by reflection, further comprising:

a light source to illuminate said vane;

a first light detector to detect light reflecting from the vane as a first light intensity measurement;

a second light detector to detect light reflecting from the vane as a second light intensity measurement; and a computational device to determine an angle of rotation using the first and second light intensity measurements.

26. The rotation sensor recited in claim 23, wherein the vane diffusely scatters light by reflection, further comprising:

a first light source to illuminate said vane;

a second light source to illuminate the vane;

a light detector to detect light reflecting from the vane as a light intensity measurement, wherein light reflecting from the vane due to illumination by the first light source is a first intensity measurement and light reflecting from the vane due to the second light source is a second intensity measurement;

means for alternating illumination of the vane by the first and second light sources; and a computational device to determine a rotation: angle using the first and second light intensity measurements.

27. The rotation sensor recited in claim 23, wherein the vane diffusely scatters light by reflections further comprising:

a light source to illuminate the vane;

a photodiode to detect light reflecting from the vane as a light intensity measurement; and a computational device to determine a rotation angle using the light intensity measurement.

28. The rotation sensor recited in claim 23, wherein the vane has a hole, further comprising:

a light source to transmit light through the hole;

a light detector to detect light transmitted through the hole by the light source as a light intensity measurement; and a computational device to determine a rotation angle using the light intensity measurement.

29. The rotation sensor recited in claim 23, further comprising:

a cam fixably attached to the vane;

one or more pairs of electrodes, each pair having a first electrode on one side of the cam, and a second electrode on another side of the cam;

a current source connected across each pair of electrodes; and a computational device to determine a rotation angle using an impedance measurable across each electrode pair.

30. The rotation sensor recited in claim 23, further comprising:

a fiber optic cable fixably attached to the vane to form a loop;

an optical processor having a light source to send a pulse through one end o the fiber optic cable and an optical detector to detect light intensity returning at the other end of the cable; and a computational device to determine rotation angle based on the light intensity.

31. A method for sensing rotation of a vehicle about an axis, comprising the steps of:

connecting a vane to a top and a bottom of a fluid-filled sealed container so that the container can rotate freely about the vane via a shaft, the shaft defining an axis of rotation about which the rotation is sensed; and mounting the vane to a vehicle such that the axis of rotation substantially aligns with an axis of rotation of the vehicle for which rotation is to be sensed.

32. The method recited in claim 31, further comprising the step of imbalancing the vane.

33. The method recited in claim 31, wherein the vane diffusely scatters light by reflection, further comprising the steps of:

illuminating the vane using a light source;

detecting light reflecting from the vane as a first light intensity measurement in a first light detector;

detecting light reflecting from the vane as a second light intensity measurement in a second light detector; and determining an angle of rotation using the first and second light intensity measurements.

34. The method recited in claim 31, wherein the vane diffusely scatters light by reflection, further comprising the steps of:

illuminating the vane using a first light source;

illuminating the vane using a second light source;

detecting light reflecting from the vane as a light intensity measurement, wherein light reflecting from the vane due to illumination by the first light source is a first intensity measurement and light reflecting from the vane due to the second light source is a second intensity measurement;

alternating illumination of the vane by the first and second light sources; and determining a rotation angle using the first and second light intensity measurements.

35. The method recited in claim 31, wherein the vane diffusely scatters light by reflection, further comprising the steps of:

illuminating the vane using a light source;

detecting light reflecting from the vane as a light intensity measurement; and determining a rotation angle using the light intensity measurement.

36. The method recited in claim 31, wherein the vane has a hole, further comprising the steps of:

transmitting light through the hole;

detecting light transmitted through the hole as a light intensity measurement; and determining a rotation angle using the light intensity measurement.

37. The method recited in claim 31, further comprising:

fixably attaching a cam to the vane;

placing one or more pairs of electrodes around the vane, each pair having a first electrode on one side of the cam, and a second electrode on another side of the cam;

connecting a current source across each pair of electrodes; and determining a rotation angle using an impedance measurable across each electrode pair.

38. The rotation sensor recited in claim 31, further comprising:

fixably attaching a fiber optic cable to the vane to form a loop;

sending a light pulse through one end o the fiber optic cable;

optically detecting light intensity returning at the other end of the cable; and determining rotation angle based on the light intensity.

* * * * *